United States Patent [19]

Martischius et al.

[11] Patent Number: 4,959,077
[45] Date of Patent: Sep. 25, 1990

[54] FUELS FOR GASOLINE ENGINES

[75] Inventors: Franz-Dieter Martischius, Neustadt; Hans P. Rath, Gruenstadt; Hans-Henning Vogel, Frankenthal; Norbert Greif, Bobenheim; Knut Oppenlaender, Ludwigshafne; Walter Denzinger, Speyer; Heinrich Hartmann, Limburgerhof, all of Fed. Rep. of Germany

[73] Assignee: BASF Aktiengesellschaft, Ludwigshafen, Fed. Rep. of Germany

[21] Appl. No.: 243,072

[22] Filed: Sep. 12, 1988

[30] Foreign Application Priority Data

Sep. 15, 1987 [DE] Fed. Rep. of Germany ....... 3730885
Oct. 1, 1987 [DE] Fed. Rep. of Germany ....... 3733172

[51] Int. Cl.$^5$ ............................ C10L 1/18; C10L 1/22
[52] U.S. Cl. ............................ 44/62; 44/70; 44/71
[58] Field of Search ............................ 44/62, 70, 71

[56] References Cited

U.S. PATENT DOCUMENTS

| | | | |
|---|---|---|---|
| 2,542,542 | 2/1951 | Lippincott et al. | 252/56 |
| 3,051,562 | 8/1962 | Gee et al. | 44/62 |
| 3,126,260 | 3/1964 | Van der Minne et al. | 44/62 |
| 3,382,056 | 5/1968 | Mermedbasich | 44/62 |
| 3,449,250 | 6/1969 | Fields | 44/62 |
| 3,506,625 | 4/1970 | Patinkin et al. | 260/78.5 |
| 3,694,176 | 9/1972 | Miller | 44/62 |
| 4,161,452 | 7/1979 | Stambaugh et al. | 252/34 |
| 4,163,645 | 8/1979 | Cheng et al. | 44/62 |

FOREIGN PATENT DOCUMENTS

| | | |
|---|---|---|
| 1258027 | 1/1961 | France . |
| 1308046 | 2/1973 | United Kingdom . |
| 2129012 | 5/1984 | United Kingdom . |
| 2177418 | 1/1987 | United Kingdom . |

Primary Examiner—Olik Chaudhuri
Assistant Examiner—Ellen M. McAvoy
Attorney, Agent, or Firm—Keil & Weinkauf

[57] ABSTRACT

A fuel for gasoline engines contains a small amount of a copolymer of an olefin of from 2 to 40 carbon atoms and/or a cycloolefin of from 3 to 10 carbon atoms with maleic anhydride and/or a copolymer of an alkyl vinyl ether of from 1 to 30 carbon atoms in the alkyl group and/or a cycloalkyl vinyl ether of from 3 to 10 carbon atoms in the alkyl group with maleic anhydride and/or a copolymer of an alkyl vinyl ether of from 1 to 30 carbon atoms in the alkyl group and/or a cycloalkyl vinyl ether of from 3 to 10 carbon atoms in the alkyl group and an olefin of from 2 to 40 carbon atoms and/or a cycloolefin of from 3 to 10 carbon atoms with maleic anhydride having a total molecular weight of from 500 to 20,000 g per mole, the carboxyl groups on the copolymer having been wholly or partly converted with an alkali metal or alkaline earth metal to form an alkali metal or alkaline earth metal salt and the remaining carboxyl groups having been converted with an alcohol and/or an amine of up to 50 carbon atom into the corresponding ester and/or amide groups and/or ammonium salts.

3 Claims, No Drawings

FUELS FOR GASOLINE ENGINES

The present invention relates to fuels for gasoline engines, containing copolymers of olefins of from 2 to 40 carbon atoms and/or cycloolefins of from 3 to 10 carbon atoms with maleic anhydride and/or copolymers of alkyl vinyl ethers of from 1 to 30 carbon atoms in the alkyl group and/or cycloalkyl vinyl ethers of from 3 to 10 carbon atoms in the alkyl group with maleic anhydride and/or copolymers of alkyl vinyl ethers of from 1 to 30 carbon atoms in the alkyl group and/or cycloalkyl vinyl ethers of from 3 to 10 carbon atoms in the alkyl group and olefins of from 2 to 40 carbon atoms and/or cycloolefins of from 3 to 10 carbon atoms with maleic anhydride, the carboxyl groups on the copolymers being wholly or partly in the form of the alkali metal or alkaline earth metal salts and remaining, if any, carboxyl groups being present in the form of ester and/or amide groups and/or ammonium salt groups.

It is known from German Laid-Open Application DOS No. 3,620,651 to prevent or reduce wear at the exhaust valves or valve seats of gasoline engines by adding to the fuel small amounts of alkali metal or alkaline earth metal salts of certain derivatives of succinic acid. However, the compounds have the disadvantage that they do not have a corrosion-inhibiting effect in gasoline engines.

It is an object of the present invention to find compounds which not only prevent or reduce wear at the valves of gasoline engines but also inhibit corrosion in gasoline engines.

We have found, surprisingly, that this object is achieved with a fuel for gasoline engines which contains a small amount of a copolymer of an olefin of from 2 to 40 carbon atoms and/or a cycloolefin of from 3 to 10 carbon atoms with maleic anhydride and/or a copolymer of an alkyl vinyl ether of from 1 to 30 carbon atoms in the alkyl group and/or a cycloalkyl vinyl ether of from 3 to 10 carbon atoms in the alkyl group with maleic anhydride and/or a copolymer of an alkyl vinyl ether of from 1 to 30 carbon atoms in the alkyl group and/or a cycloalkyl vinyl ether of from 3 to 10 carbon atoms in the alkyl group and an olefin of from 2 to 40 carbon atoms and/or a cycloolefin of from 3 to 10 carbon atoms with maleic anhydride having a total molecular weight of from 500 to 20,000 g per mole, the carboxyl groups on the copolymer having been wholly or partly converted with an alkali metal or alkaline earth metal to form an alkali metal or alkaline earth metal salt and the remaining carboxyl groups having been converted with an alcohol and/or an amine of up to 50 carbon atoms into the corresponding ester and/or amide groups and/or ammonium salts.

The novel fuel additives have the advantage that they do not impair the action of conventional gasoline additives in gasoline engines and at the same time prevent or at least strongly reduce wear at the valves and, what is more, surprisingly considerably reduce or even prevent corrosion in gasoline engines.

The fuel additives according to the invention are conveniently prepared in two process stages. The first process stage comprises the preparation of copolymers of olefins of from 2 to 40 carbon atoms and/or cycloolefins of from 3 to 10 carbon atoms with maleic anhydride and/or copolymers of alkyl vinyl ethers of from 1 to 30 carbon atoms in the alkyl group and/or cycloalkyl vinyl ethers of from 3 to 10 carbon atoms in the alkyl group with maleic anhydride and/or copolymers of alkyl vinyl ethers of from 1 to 30 carbon atoms in the alkyl group and/or cycloalkyl vinyl ethers of from 3 to 10 carbon atoms in the alkyl group and olefins of from 2 to 40 carbon atoms and/or cycloolefins of 3 to 10 carbon atoms with maleic anhydride. In the second process stage the olefin/maleic anhydride copolymers or cycloolefin/maleic anhydride copolymers or vinyl ether/maleic anhydride copolymers or vinyl ether/olefin/maleic anhydride copolymers or vinyl ether/cycloolefin/maleic anhydride copolymers are reacted completely or partially, with alkali metal or alkaline earth metal to form alkali metal or alkaline earth metal salts. All the copolymer carboxyl groups are advantageously converted when the copolymer alkali metal or alkaline earth metal salts obtained are already sufficiently soluble in the fuels to which they are to be added. If they are not sufficiently soluble, only some of the copolymer carboxyl groups will advantageously be reacted with alkali metal or alkaline earth metal to form alkali metal or alkaline earth metal salts and the remaining carboxyl groups will be reacted with alcohols and/or amines to give the corresponding ester and/or amide groups and/or ammonium salts in order to obtain adequate solubility. To make the fuel additives sufficiently soluble, furthermore, it will be advantageous to use in the preparation of copolymers of vinyl ethers having a small number of carbon atoms in the alkyl/cycloalkyl group in the second process stage in the further reaction with alcohols and/or amines relatively long-chain alcohols and/or amines and/or to increase if necessary the proportion of carboxyl groups to be reacted with the alcohols and/or amines. In the same way, with vinyl ethers having a higher number of carbon atoms in the alkyl/cycloalkyl group it is possible to use in the preparation of the copolymers in the second process stage alcohols and/or amines having shorter alkyl chains and/or to reduce the proportion of carboxyl groups to be reacted with the alcohols and/or amines. The same is true if the copolymers, in addition to the vinyl ether units, also contain olefin and cycloolefin units and with the olefin/maleic anhydride copolymers or cycloolefin/maleic anhydride copolymers of the olefins and cycloolefins used.

Suitable carboxyl-containing copolymers are copolymers of olefins and/or cycloolefins with maleic anhydride and copolymers of alkyl vinyl ethers and/or cycloalkyl vinyl ethers with maleic anhydride and also copolymers which, in addition to maleic anhydride and alkyl vinyl ethers or cycloalkyl vinyl ethers, additionally contain olefin or cycloolefin units in the molecule. Preferably, the copolymers have a strictly alternating structure, so that a maleic anhydride molecule is followed in the polymer chain by a vinyl ether or a cycloolefin or olefin molecule. For this reason such copolymers have a molar ratio of maleic anhydride:olefin/cycloolefin or of maleic anhydride:vinyl ether or of maleic anhydride:total of vinyl ether and olefin of 1:1.

To prepare the alternating copolymers of maleic anhydride and vinyl ethers, alkyl vinyl ethers having straight-chain or branched alkyl groups of 1 to 30 carbon atoms, preferably of from 4 to 24 carbon atoms, and/or cycloalkyl vinyl ethers of from 3 to 10 carbon atoms, preferably of from 4 to 8 carbon atoms, in the cycloalkyl group are used. Alkyl vinyl ethers are for example methyl vinyl ether, ethyl vinyl ether, n-propyl vinyl ether, isopropyl vinyl ether, n-butyl vinyl ether, isobutyl vinyl ether, tert.-butyl vinyl ether, n-pentyl vinyl ether, n-hexyl vinyl ether, 2-methylpentyl vinyl ether, n-heptyl vinyl ether, n-octyl vinyl ether, 2-ethylhexyl vinyl ether, 2,2,4-trimethylpentyl vinyl ether, n-decyl vinyl ether, dodecyl vinyl ether, isododecyl vinyl ether, n-tridecyl vinyl ether, isotridecyl vinyl ether, n-tetradecyl vinyl ether, n-hexadecyl vinyl ether, n-octadecyl vinyl ether, n-eicosyl vinyl ether, n-docosyl vinyl ether, n-tetracosyl vinyl ether, n-hexacosyl vinyl ether, n-octacosyl vinyl ether and oleyl vinyl ether and also mixtures thereof. Cycloalkyl vinyl ethers are for example cyclobutyl vinyl ether, cyclopentyl vinyl ether, cyclohexyl vinyl ether and cyclooctyl vinyl ether. Olefins and cycloolefins which are used as such or combined with alkyl vinyl ethers and/or cycloalkyl vinyl ethers are straight-chain and/or branched olefins of from 2 to 40 carbon atoms, preferably of from 4 to 30 carbon atoms, and cycloolefins of from 3 to 10 carbon atoms, preferably of from 4 to 8 carbon atoms. Particularly suitable olefins are those where the double bond is in the 1-position. Olefins are for example: ethene, propene, n-but-1-ene, isobut-1-ene, n-pent-1-ene, 3-methylbut-1-ene, n-hex-1-ene, 4-methylpent-1-ene, 3,3-dimethylbut-1-ene, n-hept-1-ene, 4-methylhex-1-ene, n-hept-1-ene, 5-methylhex-1-ene, 4,4-dimethylpent-1-ene, n-oct-1-ene, 2,4,4-trimethylpent-1-ene, 2,4,4-trimethylpent-2-ene, diisobutene (isomer mixture of about 80% of 2,4,4-trimethylpent-1-ene and about 20% of 2,4,4-trimethylpent-2-ene), 4,4-dimethylhex-1-ene, dec-1-ene (Gulftene 10*), dodec-1-ene (Gulftene 12*), tetradec-1-ene (Gulftene 14*), hexadec-1-ene (Gulftene 16*), octadec-1-ene (Gulftene 18*), $C_{20}$-olefin-1, $C_{22}$-olefin-1, $C_{24}$-olefin-1, $C_{20}$–$C_{24}$-olefin-1 fraction (Gulftene 20–24*), $C_{26}$-olefin 1, $C_{28}$-olefin-1, $C_{24}$–$C_{28}$-olefin-1 fraction (Gulftene 24–28*), $C_{30}$-olefin-1 (Gulftene 30+*), $C_{40}$-olefin-1 and also mixtures thereof. Examples of cycloolefins are cyclobutene, cyclopentene, cyclohexene, cycloheptene and cyclooctene.

* Commercial products from Gulf Oil Chemical Company, U.S.A.

If olefins and/or cycloolefins are used combined with alkyl vinyl ethers and/or cycloalkyl vinyl ethers, the olefins and/or cycloolefins are generally used in amounts of from 0 to 80 mol %, preferably of from 1 to 80 mol %, in particular of from 1 to 60 mol %, based on the total amount of vinyl ether and olefin and/or cycloolefin.

The maleic anhydride used as comonomer can be of the usual quality commercially available. However, it is also possible to use a maleic anhydride which contains up to 20% of other olefinically unsaturated dicarboxylic anhydrides, for example itaconic, glutaconic, methylenemaleic or citraconic anhydride. The concomitants mentioned likewise polymerize with alkyl vinyl ethers and olefins in a molar ratio.

The alternating copolymers have molecular weights of from 500 to 20,000 g/mol, preferably of from 800 to 10,000 g/mol.

They are prepared by conventional methods of polymerization, such as mass, suspension, precipitation and solution polymerization, and initiation with customary free radical donors, e.g. acetylcyclohexanesulfonyl peroxide, diacetyl peroxodicarbonate, dicyclohexylperoxodicarbonate, di-2-ethylhexyl peroxodicarbonate, tert.-butyl perneodecanoate, 2,2'-azobis(4-methoxy-2,4-dimethylvaleronitrile), tert.-butyl perpivalate, tert.-butylper-2-ethylhexanoate, tert.-butyl permaleate, 2,2'-azobis(isobutyronitrile), bis(tert.-butyl peroxide)cyclohexane, tert.-butyl peroxoisopropyl carbonate, tert.-butyl peracetate, dicumyl peroxide, di-tert.-amyl peroxide, di-tert.-butyl peroxide, p-methane hydroperoxide, cumene hydroperoxide, tert.-butyl hydroperoxide and mixtures thereof. Customarily these initiators are used in amounts of from 0.1 to 10% by weight, preferably of from 0.2 to 5% by weight, based on the monomers vinyl ether and, as the case may be, olefin and/or cycloolefin+maleic anhydride.

Customarily, the copolymerization takes place at from 40° to 250° C., preferably at from 80° to 220° C., and, if olefins or cycloolefins or vinyl ethers and any olefins and/or cycloolefins (hereinafter the term "olefin" or "olefins" in connection with the copolymers according to the invention is to be understood as including the cycloolefins which may be used) having boiling points below the polymerization temperature are used, advantageously under super-atmospheric pressure. The polymerization is advantageously carried out with the exclusion of air, i.e., if it is not possible to employ boiling conditions, under inertizing agents, for example nitrogen, Since atmospheric oxygen retards the polymerization. By using redox coinitiators, for example benzoin, dimethylaniline or ascorbic acid, and organic-soluble complexes of heavy metals such as copper, cobalt, manganese, iron, nickel and chromium, the reaction can be speeded up. The amounts customarily used range from 0.1 to 2000 ppm by weight, preferably from 0.1 to 1000 ppm by weight. In choosing the initiator or initiator system it is advisable to ensure that at the polymerization temperature selected the half-life of the initiator or initiator system is not less than 3 hours. At 150° C., for example, the half-life of tert.-butyl hydroperoxide is less than 3 hours. The initiator system comprising 1% by weight of tert.-butyl hydroperoxide/5 ppm by weight of copper(II) acetylacetonate, by contrast, shows that even at 100° C., a polymerization behavior similar to that of 1% by weight of tert.-butyl hydroperoxide at 150° C. If, for example, the polymerization is started at low temperatures and completed at higher temperatures, general practice is to use two or more initiators.

To obtain low molecular weight copolymers, it is frequently advantageous to employ regulants. Suitable regulants are for example allyl alcohols, organic mercapto compounds, such as 2-mercaptoethanol, 2-mercaptopropanol, mercaptoacetic acid, mercaptopropionic acid, tert.-butylmercaptan, n-butylmercaptan, n-octylmercaptan, n-dodecylmercaptan and tert.-dodecylmercaptan, which in general are used in amounts of from 0.1% by weight to 10% by weight.

The abovementioned initiators, coinitiators, regulants and polymerization temperatures are equally usable for all methods of polymerization. Apparatus suitable for polymerization comprises for example customary stirred kettles, equipped for example with horseshoe, blade, impeller or multistage pulse countercurrent stirrers.

The simplest method of polymerization is mass polymerization. In mass polymerization, the olefins, or the vinyl ethers with or without olefins, and the maleic anhydride are polymerized in a molar ratio in the presence of an initiator and in the absence of a solvent. This process is particularly suitable for those copolymers where the olefin used, or the vinyl ether with or without olefin used, possess 8 or more carbon atoms. Advantageously, the olefin, or the vinyl ether with or without olefin, or a mixture of different olefins, or of vinyl ethers with or without olefins, are introduced initially in the reactor and heated with stirring to the desired polymerization temperature, and the maleic anhydride, the initiator and any coinitiator and regulant are metered in at a uniform rate in the course of from 1 to 10 hours, preferably over from 2 to 5 hours. It is advantageous here to meter in the initiator and the coinitiator separately in the form of solutions in the olefin, or vinyl ether and any olefin, to be copolymerized. The maleic anhydride is easy to meter in in the form of a melt heated to e.g. 70° C. Sometimes it is of advantage to use olefin, or vinyl ether with or without olefin, in excess, for example 10% excess, in order to obtain complete polymerization of the maleic anhydride. The excess olefin, or the excess vinyl ether and any excess olefin, can then be removed from the copolymer melt by distillation, preferably under reduced pressure. The copolymer can then be reacted directly in the melt or alternatively after dilution with a suitable solvent for use as an engine fuel additive according to the invention.

Further methods for the simple preparation of copolymers of maleic anhydride with olefins, or with vinyl ethers with or without olefins, are precipitation and suspension polymerization. In precipitation polymerization, use is made of those solvents in which the monomers, olefin, or vinyl ether and any olefin, and maleic anhydride, are soluble and the copolymer formed is insoluble and precipitates. Such solvents are for example aromatic hydrocarbons such as benzene, toluene, o-xylene, m-xylene, p-xylene and the technical grade xylene mixtures, ethylbenzene, cumene and also halohydrocarbons such as methylene chloride, 1,1- and 1,2-dichloroethane, 1,1,1-trichloroethane, 1,1,2-trichloroethylene, 1,1,2-trichloroethane, perchloroethylene, 1,2-dichloropropane, butyl chloride, 1,1,2-trichloro-1,2,2-trifluoroethane, 1,1,1,2-tetrachloro-2,2-difluoroethane, 1,1,2,2-tetrachloro-1,2-difluoroethane, and ethers such as diethyl ether, dipropyl ether, dibutyl ether, methyl tert.-butyl ether, diethylene glycol dimethyl ether and mixtures thereof. In suspension polymerization use is made of those solvents in which all or at least one of the monomers and the polymers formed are insoluble. Suitable for this purpose are straight-chain and branched aliphatic and cycloaliphatic hydrocarbons. Preferred examples are pentane, hexane, heptane, octane, isooctane, cyclohexane, methylcyclohexane, ethylcyclohexane, dimethylcyclohexane, diethylcyclohexane and mixtures thereof. In the practice of precipitation polymerization it is advantageous, in particular if concentrations above 40% by weight are employed, and with suspension polymerization it is absolutely mandatory, to perform the polymerization in the presence of a protective colloid to prevent agglomerization. Suitable protective colloids are polymeric substances which are readily soluble in the solvents and do not react with the monomers. Suitable for use as protective colloids are for example copolymers of maleic anhydride with vinyl alkyl ethers and/or olefins of from 8 to 20 carbon atoms and monoesters thereof with $C_{10}$–$C_{20}$-alcohols or mono- and diamides with $C_{10}$–$C_{20}$-alkylamines and also polyalkyl vinyl ethers where the alkyl group contains from 1 to 20 carbon atoms, for example polymethyl, polyethyl, polyisobutyl and polyoctyldecyl vinyl ethers. The amount of protective colloid added is customarily from 0.05 to to 4% by weight (based on monomers used), preferably from 0.1 to 2% by weight; frequently it is of advantage to combine a plurality of protective colloids. In the polymerization, it is advantageous to introduce the solvent, the protective colloid and a monomer initially in the reactor and, at the chosen polymerization temperature, to add the comonomer and the initiator and any coinitiator and regulant with intensive stirring. It is in general immaterial here whether the maleic anhydride is introduced initially and the olefin or the vinyl ether and any olefin are metered in or whether the olefin or the vinyl ether and any olefin are introduced initially and the maleic anhydride is metered in. It is of course also possible to introduce initially only the solvent and protective colloid and to meter the monomers, olefin, or vinyl ether and any olefin, plus maleic anhydride, conjointly. The inflow times for monomer and initiator range in general from 1 to 10 hours, preferably from 2 to 5 hours. It is also possible to polymerize all the starting materials conjointly in one reactor, in which case, however, problems can arise with removing the heat, so that such a procedure is less advisable. The concentrations of the monomers to be polymerized range from 20 to 80% by weight, preferably from 30 to 70% by weight. The polymers can be isolated from the polymerization product suspensions directly in evaporators, for example belt dryers, paddle dryers, spray dryers and fluidized bed dryers. On performing the polymerization in suitable solvents which can be added directly to motor fuels, the further conversion into the alkali metal or alkaline earth metal salt and ester and/or amide and/or ammonium salt can be carried out directly in suspension. Precipitation and suspension polymerization are particularly suitable for preparing copolymers of maleic anhydride and olefins of from 2 to about 10 carbon atoms and/or short-chain vinyl ethers. If relatively long-chain olefins are used or relatively long-chain vinyl ethers with or without olefins, it may even happen that the copolymers formed are soluble in the solvent, so that the polymerization may even be considered a solution polymerization, as described in detail hereinafter, while if short-chain olefins are used or short-chain vinyl ethers with or without olefins, the copolymers formed still precipitate readily in the same solvent.

Solution polymerization is carried out in solvents in which the monomers and copolymers formed are soluble. Suitable for this purpose are any solvents which meet this condition and which do not react with the monomers. Examples are acetone, methyl ethyl ketone, diethyl ketone, methyl isobutyl ketone, ethyl acetate, butyl acetate, tetrahydrofuran and dioxane, the last two being particularly suitable for obtaining low molecular weight copolymers. As with mass, suspension and precipitation polymerization, here too it is advisable to introduce the solvent and one monomer component initially and to meter in the second component together with the initiator and any coinitiator and regulant. Specifically, solvent and maleic anhydride may be introduced initially in the polymerization reactor and, after the polymerization temperature has been attained, the olefin, or the vinyl ether with or without olefin, and the initiator and any coinitiator and regulant may then be metered in. It is more favorable, however, to introduce solvent and olefin or vinyl ether with or without olefin, initially and to meter in the maleic anhydride and initiator and any coinitiator and regulant at the chosen polymerization temperature. This procedure gives less colored polymer solutions. The concentrations of the monomers to be polymerized range from 20 to 80% by weight, preferably from 30 to 70% by weight. The solid copolymer can be isolated without problems by evaporating the solvent. However, here too it is advantageous to select a solvent in which the further reaction to give an alkali metal or alkaline earth metal salt and with alcohols and/or amines can take place.

The copolymers obtained in the first process stage from olefins, or from vinyl ethers with or without olefins, and maleic anhydride are subsequently converted wholly or partly into alkali metal or alkaline earth metal salts and, if the conversion into alkali metal or alkaline earth metal salts does not go to completion, reacted with alcohols and/or amines to give the esters and/or amides and/or ammonium salts. However, it is also possible to carry out the subsequent conversion of copolymers in reverse order by first reacting the copolymers with amines and/or alcohols to give the corresponding esters and/or amides and/or ammonium salts and thereafter to convert them into alkali metal and/or alkaline earth metal salts.

To convert the copolymers into esters and/or amides and/or ammonium salts use is made of alcohols and/or amines having up to 50 carbon atoms.

In general, use is made of amines of the general formula

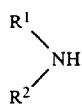

where $R^1$ and $R^2$ are identical or different, each being substituted or unsubstituted hydrocarbyl of in general from 1 to 25, preferably from 5 to 25, carbon atoms which may be olefinically monounsaturated, or where $R^1$ is H— and $R^2$ is substituted or unsubstituted hydrocarbyl of in general from 1 to 50, preferably from 5 to 50, in particular from 8 to 30, carbon atoms which may be olefinically monounsaturated. Suitable amines are for example di-2-ethylhexylamine and dioleylamine. It is of particular advantage to use isotridecylamine and diisotridecylamine.

To esterify the copolymers of olefins, or of vinyl ethers with or without olefins, and maleic anhydride, use is in general made of alcohols of from 1 to 50 carbon atoms, preferably from 4 to 40 carbon atoms, in particular from 5 to 30 carbon atoms. Given a sufficiently long α-olefin in the copolymer, it is also possible to use polyhydric alcohols, e.g. neopentylglycol or pentaerythritol.

In general, the carboxyl groups on the copolymers of olefins, or of vinyl ethers with or without olefins, and maleic anhydride are converted to an extent of from 5 to 80%, preferably of from 10 to 70%, in particular of from 15 to 60%, into amides and/or ammonium salts and/or esters. The reaction of the copolymers of olefins, or of vinyl ethers with or without olefins, and maleic anhydride with amines and/or alcohols in general takes place in the melt or after dilution with a suitable solvent. Suitable solvents are for example those mentioned above for the preparation of the copolymers from olefins or from vinyl with or without olefins and maleic anhydride by precipitation, suspension and solution polymerization. Preference is given to using aromatic, aliphatic or cycloaliphatic hydrocarbons.

The reaction with amines is in general carried out at from 20° to 150° C., preferably at from 20° to 120° C., in particular at from 30° to 100° C. Esterification with alcohols takes place in general at from 20° to 200° C., preferably at from 80° to 200° C.

In detail, the reaction with amines, for example, is performed by introducing the copolymer of olefins, or of vinyl ethers with or without olefins, and maleic anhydride initially in for example a reaction vessel, for example in molten form or in a solvent, adding the amine with stirring at from 60° to 90° C., and reacting with stirring for from 1 to 2 hours. The product obtained in general is the monoamide, while, on addition of excess amine, the remaining carboxyl group is present in the form of an alkylammonium salt.

The same procedure is also applicable to the esterification of copolymers of olefins, or of vinyl ethers with or without olefins, and maleic anhydride with alcohols which can be carried out thermally or by acid catalysis, for example using phosphoric acid. The products are in general monoesters which are usable as such or following partial amidation or partial neutralization of the remaining carboxyl groups with amines are usable for further conversion into alkali metal or alkaline earth metal salts.

The amides and/or esters and/or ammonium salts obtained of copolymers of olefins, or of vinyl ethers with or without olefins, and maleic anhydride are reacted with a basic alkali metal or alkaline earth metal compound, for example a hydroxide, carbonate or alcoholate, to convert the remaining carboxyl groups into alkali metal or alkaline earth metal salts. For instance, to prepare potassium salts, the solutions of amides and/or esters and/or ammonium salts of copolymers of olefins or of vinyl ethers with or without olefins and maleic anhydride are reacted with the calculated amount of potassium compound, for example a solution of KOH or $KOCH_3$, advantageously in an alcohol, for example a $C_1$-$C_6$-alcohol such as methanol, ethanol, propanol or butanol. The solvent and the water formed are advantageously evaporated off the reaction mixture obtained under reduced pressure.

The engine fuel additives according to the invention are used in the form of alkaline earth metal salts or alkali metal salts, the latter being preferred. Suitable alkaline earth metal salts are for example the magnesium and calcium salts. Suitable alkali metal salts are the lithium, sodium, potassium, rubidium and cesium salts, of which the potassium salts are particularly preferred. The alkali metal or alkaline earth metal content in the engine fuel additives according to the invention is, based on the fuel additive, in general not less than 3% by weight, preferably from 3 to 25% by weight, in particular from 4 to 20% by weight, particularly advantageously from 4 to 15% by weight.

The novel engine fuel additives are added to fuels for gasoline engines in general in amounts of from 10 to 2000 ppm by weight, preferably from 50 to 1000 ppm by weight.

The engine fuels according to the invention, in addition to the alkali metal or alkaline earth metal salts, may also contain known antioxidants on a phenol or amine basis. More particularly, it is advantageous to combine engine fuel additives for cleaning and keeping clean the intake system with phenolic antioxidants for increasing the storage stability of engine fuels.

Good solvents and solubilizers for the abovementioned engine fuel additive components are residual oils from the oxo alcohol synthesis.

Preference is given to using oxo alcohol residues from butanol, isobutanol, pentanol, hexanol, heptanol, octanol, nonanol, decanol, undecanol or dodecanol synthesis. It is particularly advantageous to use oxo alcohols residues from butanol synthesis. Pursuant to these it is also possible to use other solvents or solvent mixtures which produce a homogeneous mixture of the components in the abovementioned weight ratios. The action of the gasoline additives according to the invention is not restricted to automotive gasolines. We have found that they can also be used in aviation fuels, in particular in piston engines. Similarly, the compounds according to the invention are effective not only in carburetor engines but also in fuel injection engines.

The engine fuels provided with the novel additive may also contain other, customary additives, for example additives improving the octane rating, or else oxygen-containing components, for example methanol, ethanol or methyl tert.-butyl ether.

The Examples which follow illustrate the invention.

Examples 1 to 5 describe the preparation of copolymers from olefins and maleic anhydride and Examples 6 to 12 the preparation of copolymers from vinyl ethers, or vinyl ethers plus olefins, and maleic anhydride.

Parts are by weight. The molecular weights were determined by gel permeation chromatography using tetrahydrofuran as eluent and calibrating with narrow polystyrene fractions.

EXAMPLE 1

A 5-l capacity stirred stainless steel pressure kettle was charged with 980 parts of maleic anhydride, 1440 parts of technical grade xylene and 14 parts of polyvinyl ether having a K value of 50 (measured at 1% strength by weight in cyclohexanone at 25° C.), and this initial charge was overlaid three times with 3 bar of nitrogen and heated to 140° C. Thereafter 600 parts of isobutene, and a solution of 46.2 parts of tert.-butyl 2-perethylhexanoate and 30.8 parts of di-tert.-butyl peroxide in 100 parts of xylene were metered at a uniform rate into the stirred kettle in the course of 3 hours and 3.5 hours respectively, which was followed by heating for a further hour. The pressure was then carefully released while the xylene was distilled off, toward the end under reduced pressure. At 140° C. the polymer was obtained in the form of a melt. After cooling the polymer was a pale brown, brittle resin having a molecular weight of 2500 g/mol.

EXAMPLE 2

A reactor as in Example 1 was charged with 1612.5 parts of diisobutene and 73.5 parts of maleic anhydride, and this initial charge was overlaid three times with 3 bar of nitrogen and heated to 160° C. Thereafter 1396.5 parts of maleic anhydride and a solution of 150 parts of di-tert-butyl peroxide in 94.5 parts of diisobutene were metered in at a uniform rate in the course of 3 hours and 4 hours respectively. This was followed by a further hour of heating. Thereafter the pressure was carefully released, and the excess diisobutene was distilled off, toward the end under reduced pressure. At 150° C. the molar copolymer of maleic anhydride and diisobutene was present in the form of a melt. On solidifying it became a brittle resin. The molecular weight was 2040 g/mol.

EXAMPLE 3

A 4-l stirred glass flask was charged with 1500 parts of octadecene-1 and this initial charge was heated to 190° C. under a slow stream of nitrogen. 588 g of maleic anhydride in liquid form and a solution of 21 parts of di-tert-butyl peroxide in 42.8 parts of octadecene-1 were metered in over 2 hours. This was followed by a further 2 hours of heating, and the viscous polymer melt was emptied onto a sheet and solidified into a brittle brownish resin. The molecular weight was 4800 g/mol.

EXAMPLE 4

In a 4-l stirred glass flask, 1195 parts of a $C_{20}$–$C_{24}$-olefin-1 mixture (Gulftene $C_{20}$–$C_{24}$) were heated to 190° C. in a slow stream of nitrogen, 392 parts of maleic anhydride and 16 parts of di-tert.-butyl peroxide were metered in at a uniform rate over 4 hours, and the reaction mixture was subsequently heated for a further 2 hours. Thereafter the yellowish, viscous melt was emptied onto a sheet and solidified into a yellow, brittle resin. The molecular weight was 8900 g/mol.

EXAMPLE 5

In a stirred glass flask, 1671.4 parts of a $C_{30}$-olefin (Gulftene 30+) were heated to 180° C. in a slow stream of nitrogen, and 392 parts of maleic anhydride and 20.5 parts of di-tert.-butyl peroxide were metered in at a uniform rate over 4 hours. This was followed by a further 2 hours of heating, and the viscous yellow melt was emptied onto a sheet and solidified into a yellow brittle resin. The molecular weight was 1600 g/mol.

EXAMPLE 6

In a stirred glass flask equipped with a reflux condenser, 98 parts of maleic anhydride and 300 parts of tetrahydrofuran were heated to the boil at 70° C., and 100 parts of isobutyl vinyl ether and a solution of 200 parts of tetrahydrofuran and 10 parts of tert.-butyl perpivalate, 76% strength by weight in dimethyl phthalate, were metered in at the boil at a uniform rate in the course of 4 hours. This was followed by a further 2 hours of refluxing. After cooling, the copolymer was present in the form of a 28% strength by weight solution in tetrahydrofuran. The molecular weight was 1800.

EXAMPLE 7

Example 1 was repeated, except that the isobutyl vinyl ether was replaced by 128 parts of 2-methyl-1-pentyl vinyl ether. After cooling, the copolymer was present in the form of a 31% strength by weight solution in tetrahydrofuran. The molecular weight was 2100.

EXAMPLE 8

In an apparatus as described in Example 1, 98 parts of maleic anhydride, 200 parts of technical grade xylene and 5 parts of polyethyl ether having a K value of 50 (measured at 25° and 1% strength in cyclohexanone) were brought to the boil at 140° C., and a solution of 212 parts of n-dodecyl vinyl ether and 10 parts of di-tert.-butyl peroxide in 200 parts of technical grade xylene was metered in over 5 hours, and the mixture was subsequently refluxed for a further 2 hours. The copolymer was present in the form of a 43% strength by weight viscous suspension of very fine polymer particles about 3 μ in diameter. The molecular weight was 3200.

EXAMPLE 9

In an apparatus as described in Example 1, 250 parts of technical grade xylene and 295 parts of n-octadecyl vinyl ether were brought to the boil at about 148° C., and solutions of 98 parts of maleic anhydride in 300 parts of technical grade xylene and of 9 parts of di-tert.- butyl peroxide in 51 parts of technical grade xylene were metered in in parallel over 3 hours. In the course of the addition the boiling point dropped from initially 148° C. to 138° C. Thereafter the reaction mixture was heated for a further 2 hours. The copolymer was present in the form of a yellow, viscous solution having a solids content of 42% by weight. The molecular weight was 2200.

EXAMPLE 10

In an apparatus as described in Example 1, 182 parts of a $C_{24}$-$C_{28}$-olefin (Gulftene $C_{24}$-$C_{28}$) and 200 parts of technical grade xylene were brought to the boil at 150° C., and a solution of 50 parts of vinyl isobutyl ether and 10 parts of di-tert.-butyl peroxide in 100 parts of technical grade xylene and a solution of 98 parts of maleic anhydride in 300 parts of technical grade xylene were then metered in over 4 hours. In the course of the addition the boiling point dropped from an initial 150° C. to 134° C. Thereafter the reaction mixture was refluxed for a further 2 hours. The copolymer was present in the form of a yellowish, slightly viscous 28% strength by weight solution. The molecular weight was 4800.

EXAMPLE 11

In an apparatus as described in Example 1, 236.8 parts of n-octadecyl vinyl ether and 30.4 parts of n-octa-decene-1 were heated under nitrogen to 170° C., and 98 parts of liquid maleic anhydride and 12 parts of di-tert.-butyl peroxide dissolved in 20 parts of n-octadecene were then metered in at a uniform rate in the course of 3 hours. Thereafter the reaction mixture was heated for a further 2 hours, and the clear, brownish melt was emptied onto a sheet and solidified into a brittle resin. The molecular weight was 4500.

EXAMPLE 12

In an apparatus as described in Example 1, 246.4 parts of a $C_{20}$-$C_{24}$-olefin mixture (Gulftene $C_{20}$-$C_{24}$), 25.6 parts of 2-methyl-1-pentyl vinyl ether and 200 parts of technical grade xylene were brought to the boil at about 150° C., and 98 parts of maleic anhydride dissolved in 300 parts of xylene and a solution of 12 parts of tert.-butyl hydroperoxide in 100 parts of technical grade xylene were metered in over 4 hours. Thereafter the reaction mixture was heated at a boiling point of 136° C. for a further 2 hours. The copolymer was present in the form of a 38% strength by weight solution. The molecular weight was 3600.

EXAMPLES 13 TO 30

The copolymers obtained in Examples 1 to 12 were converted in Examples 13 to 30 into the engine fuel additives according to the invention by first reacting them with amines or alcohols to give the corresponding amides or esters and thereafter to give the corresponding potassium salts, or by first converting them into the potassium salts and then reacting them with amines or alcohols to give the amides or esters, or (Examples 24 and 29) by converting them only into the potassium salts.

For conversion into amides, the copolymers of Examples 1 to 12 were dissolved in n-hexane or xylene, and the amines were added to the copolymers with stirring at from 30° to 100° C. This was followed by stirring for from 1 to 2 hours.

In the same way, the esters were obtained by thermal or acid-catalyzed reaction (in the presence of from 0.1% by weight of phosphoric acid) of the copolymers with the corresponding alcohols at from 70° to 140° C., preferably at from 90° to 110° C. The course of amide and ester formation was monitored by IR spectroscopy.

To prepare the potassium salts, solutions of the copolymers, or the reaction solutions containing the amides or esters of the copolymers, were admixed with 20% strength by weight ethanolic KOH solution containing the calculated amount of KOH, and the solvent and the water formed were distilled out of the mixture obtained at from 70° to 90° C. under reduced pressure.

The Table gives details of reaction conditions in Examples 13 to 30. MA stands for maleic anhydride. The molar quantities are based on 100 g of copolymer.

TABLE

| Example | Copolymer of Example | MA [wt. %] | Proportion of comonomer in copolymer Olefin or alkyl vinyl ether R-O-CH=CH$_2$ + any olefin [wt. %] | Mol of MA in 100 g of copolymer | MA conversion/100 g of polymer | | Neutralization of remaining carboxyl groups with KOH [mol] | Potassium content [wt. %] based on end product according to the invention |
|---|---|---|---|---|---|---|---|---|
| | | | | | with amine to form amide [mol] | with alcohols to form ester [mol] | | |
| 13 | 1 | 63.6 | isobutene 36.4 | 0.65 | $C_{13}H_{27}NH_2$ 0.25 | $C_8H_{17}$—OH 0.65 | 0.4 | 6.5 |
| 14 | 2 | 46.7 | diisobutene 53.3 | 0.48 | $(C_{13}H_{27})_2NH$ 0.24 | — | 0.24 | 10.0 |
| 15 | 3 | 28.0 | $C_{18}$-olefin 72.0 | 0.29 | $C_{13}H_{27}NH_2$ 0.05 | $C_{13}H_{27}$—OH 0.29 | 0.24 | 5.2 |
| 16 | 4 | 24.1 | $C_{20}$-$C_{24}$-olefin 75.9 | 0.25 | $C_{13}H_{27}NH_2$ 0.325 | — | 0.175 | 4.76 |
| 17 | 5 | 18.9 | $C_{30}$-olefin 81.1 | 0.19 | $(C_{13}H_{27})_2NH$ 0.250 | — | 0.13 | 4.13 |
| 18 | 4 | 24.1 | $C_{20}$-$C_{24}$-olefin 75.9 | 0.25 | — | neopentylglycol 0.05 $C_{13}H_{27}$—OH 0.15 | 0.30 | 7.85 |
| 19 | 6 | 49.5 | R = butyl 50.5 | 0.505 | $(C_{13}H_{27})_2NH$ 0.202 | — | 0.808 | 14.3 |
| 20 | 6 | 49.5 | R = butyl 50.5 | 0.505 | — | $C_{13}H_{17}$—OH 0.3257 | 0.6843 | 13.56 |
| 21 | 7 | 43.4 | R = 2-methyl-pentyl 56.6 | 0.443 | $(C_{13}H_{27})_2NH$ 0.2657 | — | 0.62 | 10.2 |

TABLE-continued

| Example | Copolymer of Example | MA [wt. %] | Proportion of comonomer in copolymer Olefin or alkyl vinyl ether R-O-CH=CH₂ + any olefin [wt. %] | Mol of MA in 100 g of copolymer | MA conversion/100 g of polymer with amine to form amide [mol] | with alcohols to form ester [mol] | Neutralization of remaining carboxyl groups with KOH [mol] | Potassium content [wt. %] based on end product according to the invention |
|---|---|---|---|---|---|---|---|---|
| 22 | 8 | 31.6 | R = dodecyl 68.4 | 0.3225 | $(C_{13}H_{27})_2NH$ 0.0774 | — | 0.5675 | 14 |
| 23 | 9 | 24.9 | R = octadecyl 75.1 | 0.254 | $(C_{13}H_{24})_2NH$ 0.099 | — | 0.409 | 10 |
| 24 | 9 | 24.9 | R = octadecyl 75.1 | 0.254 | — | — | 0.508 | 16 |
| 25 | 10 | 35 | R = butyl 18 $C_{24}$-$C_{28}$-olefin 47 | 0.357 | $(C_{13}H_{27})_2NH$ 0.1018 | — | 0.6125 | 14 |
| 26 | 10 | 35 | R = butyl 18 $C_{24}$-$C_{28}$-olefin 47 | 0.357 | — | $C_{13}H_{27}$—OH 0.1928 | 0.5218 | 12.48 |
| 27 | 11 | 25.5 | R = octadecyl 61.5 octadecene 13 | 0.2602 | $(C_{13}H_{27})_2NH$ 0.104 | — | 0.4163 | 10 |
| 28 | 11 | 25.5 | R = octadecyl 61.5 octadecene 13 | 0.2602 | — | ethylhexanol 0.1041 | 0.4163 | 12.2 |
| 29 | 11 | 25.5 | R = octadecyl 61.5 octadecene 13 | 0.2602 | — | — | 0.52 | 16.3 |
| 30 | 12 | 27.7 | R = 2-methyl-pentyl 7.2 $C_{20}$-$C_{24}$-olefin 65.1 | 0.2826 | $(C_{13}H_{27})_2NH$ 0.048 | — | 0.5172 | 14 |

EXAMPLE 31

To demonstrate the favorable effect of the fuels according to the invention on the corrosion of gasoline engines, unleaded, additive-free premium gasoline (from Erdölraffinerie Mannheim) is subjected to a corrosion test in accordance with DIN 51 585 or ASTM D 665-60 or IP 135/64 at 23° C. for 24 hours in the presence of engine fuel additives of Examples 13 to 17 and 19 to 30 according to the invention, each in amounts of 10 ppm by weight, based on potassium. With the engine fuels according to the invention the steel finger shows no corrosion whatsoever. By contrast, the fuel without additive according to the invention gave a result of corrosion grade 3.

EXAMPLE 32

In a test on an Opel Kadett engine in accordance with CEC F-02-C-79 with a fuel according to Example 31, which contains 10 ppm by weight, based on potassium, of the compound of Example 13, the valve deposits are reduced from on average 327 mg/intake valve to 204 mg/intake valve. On addition of 10 ppm by weight of the compound of Example 26 the valve deposits are reduced from on average 386 mg/intake valve to 237 mg/intake valve. This considerably reduces the customary level of additives required for protecting and keeping clean the intake systems.

We claim:

1. A fuel for four-stroke gasoline engines which comprises gasoline and from 10 to 2,000 ppm by weight of a copolymer of an olefin of from 2 to 40 carbon atoms and/or a cycloolefin of from 3 to 10 carbon atoms with maleic anhydride having a total molecular weight of from 500 to 20,000 g per mole, the carboxyl groups on the copolymer having been wholly or partly converted with an alkali metal to form an alkali metal salt and the remaining carboxyl groups having been converted with an alcohol and/or an amine of up to 50 carbon atoms into the corresponding ester and/or amide groups and/or ammonium salts.

2. A fuel as defined in claim 1, wherein the copolymer contains not less than 3% by weight of alkali metal.

3. A fuel as defined in claim 1, wherein the carboxyl groups on the copolymer have been reacted to form a potassium salt.

* * * * *